United States Patent
Hara et al.

(10) Patent No.: US 9,178,445 B2
(45) Date of Patent: Nov. 3, 2015

(54) POWER CONVERSION APPARATUS (71) Applicant: KABUSHIKI KAISHA YASKAWA DENKI, Kitakyushu-shi (JP)

(72) Inventors: Hidenori Hara, Kitakyushu (JP); Yushi Takatsuka, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 106 days.

(21) Appl. No.: 14/028,541

(22) Filed: Sep. 17, 2013

(65) Prior Publication Data
US 2014/0092658 A1 Apr. 3, 2014

(30) Foreign Application Priority Data
Sep. 28, 2012 (JP) ................. 2012-218766

(51) Int. Cl.
H02M 3/335 (2006.01)
H02M 7/525 (2006.01)
H02M 7/5387 (2007.01)
H02M 7/537 (2006.01)
H02M 7/5395 (2006.01)
H02M 1/00 (2007.01)

(52) U.S. Cl.
CPC ........ H02M 7/5395 (2013.01); H02M 7/53875 (2013.01); *H02M 2001/0054* (2013.01); *Y02B 70/1491* (2013.01)

(58) Field of Classification Search
CPC .......... H02M 7/53875; H02M 7/5395; H02M 2001/0054
USPC ................. 363/95, 97, 98, 131, 132
See application file for complete search history.

(56) References Cited

U.S. PATENT DOCUMENTS

| | | | | |
|---|---|---|---|---|
| 6,324,085 B2 * | 11/2001 | Kimura et al. | | 363/132 |
| 8,750,008 B2 * | 6/2014 | Sugiyama et al. | | 363/131 |
| 2005/0128777 A1 * | 6/2005 | Yamanaka et al. | | 363/98 |
| 2013/0155740 A1 * | 6/2013 | Takubo | | 363/98 |

FOREIGN PATENT DOCUMENTS

| | | |
|---|---|---|
| JP | 09-308263 | 11/1997 |
| JP | 2000-152661 | 5/2000 |
| JP | 2002-305883 | 10/2002 |

OTHER PUBLICATIONS

Mitsubishi electric corp, Nishio Naoki, system interconnection inverter, Nov. 28, 1997, JP 09-308263.*

(Continued)

*Primary Examiner* — Timothy J Dole
*Assistant Examiner* — Sisay G Tiku
(74) *Attorney, Agent, or Firm* — Mori & Ward, LLP (57) ABSTRACT

A power conversion apparatus includes a power converter and a PWM controller. A first switching element is coupled to a positive pole of a DC power source and one terminal of a load. A second switching element is coupled to a negative pole of the DC power source and another terminal of the load. A third switching element is coupled to the positive pole and the other terminal. A fourth switching element is coupled to the negative pole and the one terminal. The PWM controller PWM-controls the power conversion apparatus to repeat an on-period during which the DC power source outputs a voltage to the load and an off-period during which no voltage is output. The PWM controller alternately controls the first and second switching elements based on a signal set at a high or low level any time during a carrier wave period.

17 Claims, 8 Drawing Sheets

(56) References Cited

OTHER PUBLICATIONS

Mitsubishi Heavy Ind Ltd, Toyama Koji, single pahse power converter, Oct. 18, 2002, 2002-305883.*

Japanese Office Action for corresponding JP Application No. 2012-218766, Mar. 11, 2014.

Chinese Office Action for corresponding CN Application No. 201310450354.1, Jul. 28, 2015.

* cited by examiner

POWER CONVERSION APPARATUS

CROSS-REFERENCE TO RELATED APPLICATIONS

The present application claims priority under 35 U.S.C. §119 to Japanese Patent Application No. 2012-218766, filed Sep. 28, 2012. The contents of this application are incorporated herein by reference in their entirety.

BACKGROUND OF THE INVENTION

1. Field of the Invention

The present invention relates to a power conversion apparatus.

2. Discussion of the Background

Conventionally, a power conversion apparatus is known to subject a switching element constituting a bridge circuit to PWM (Pulse Width Modulation) control, thereby converting direct current (DC) power to alternating current (AC) power (see Japanese Unexamined Patent Application Publication No. 2002-305883).

SUMMARY OF THE INVENTION

According to one aspect of the present invention, a power conversion apparatus includes a power converter and a PWM controller. The power converter includes a first switching element, a second switching element, a third switching element, and a fourth switching element. The first switching element is coupled to a positive pole of a DC power source and to one terminal of a load. The second switching element is coupled to a negative pole of the DC power source and to another terminal of the load. The third switching element is coupled to the positive pole of the DC power source and to the other terminal of the load. The fourth switching element is coupled to the negative pole of the DC power source and to the one terminal of the load. The PWM controller is configured to subject the power converter to PWM control so as to repeat an on-period during which a voltage is output from the DC power source to the load and an off-period during which no voltage is output from the DC power source to the load. The PWM controller is configured to alternately control the first switching element and the second switching element based on a signal that is set at a high level or a low level any time during a carrier wave period.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

First Embodiment

Figure 1:
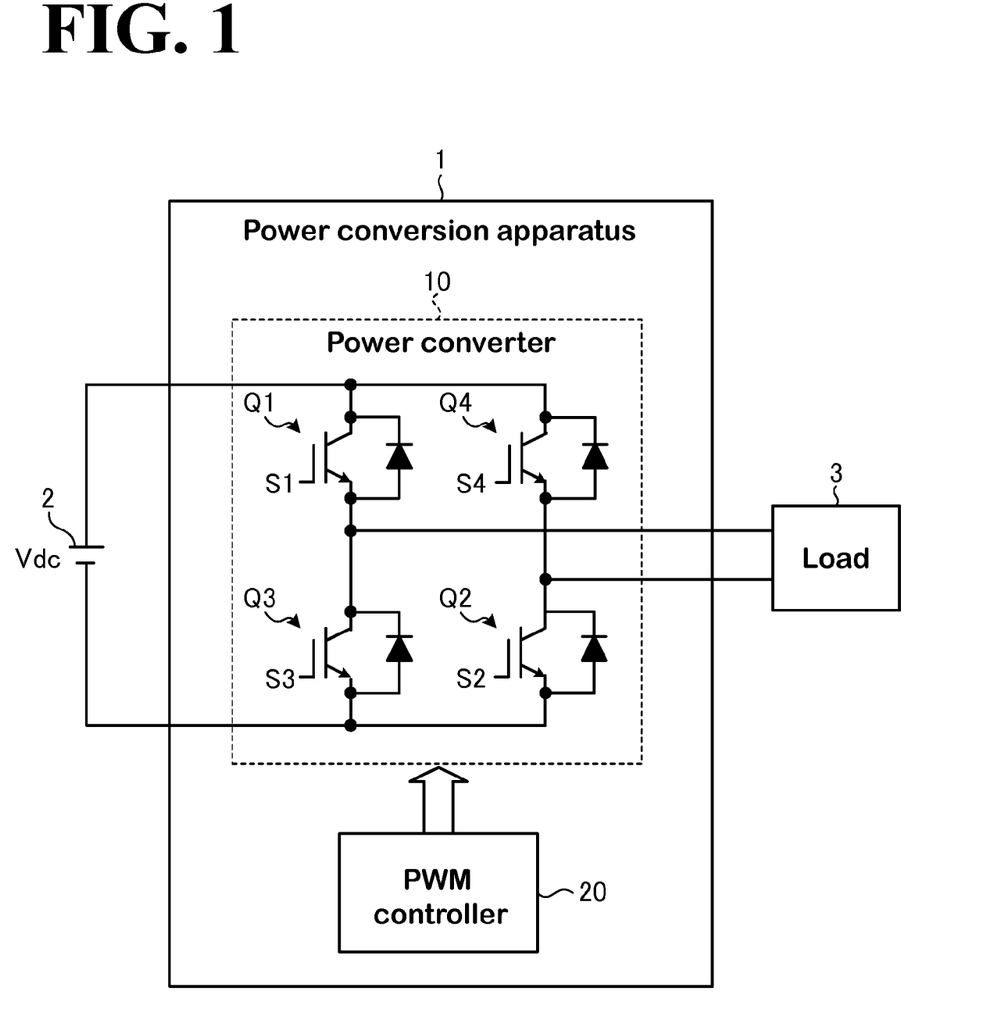
FIG. 1 is a diagram illustrating a configuration of a power conversion apparatus according to a first embodiment.

The first embodiment is concerning an exemplary power conversion apparatus that outputs AC power to a load. FIG. 1 is a diagram illustrating a configuration of the power conversion apparatus according to the first embodiment.

As shown in FIG. 1, a power conversion apparatus 1 according to the first embodiment 1 converts DC (direct current) power supplied from a DC power source 2 into AC (alternating current) power and outputs the AC power to a load 3. The power conversion apparatus 1 includes a power converter 10 and a PWM controller 20. The DC power source 2 may be prepared by rectifying an input AC source using a power conversion device.

The power converter 10 is a single-phase bridge circuit including first upper and lower arms coupled in parallel to second upper and lower arms. The first upper and lower arms include switching elements Q1 and Q3 coupled to one another in series. The second upper and lower arms include switching elements Q2 and Q4 coupled to one another in series.

The switching element Q1 and the switching element Q4 are coupled to the positive pole of the DC power source 2, while the switching element Q3 and the switching element Q2 are coupled to the negative pole of the DC power source 2. To the coupling point of the switching element Q1 and the switching element Q3, one terminal of the load 3 is coupled. To the coupling point of the switching element Q2 and the switching element Q4, another terminal of the load 3 is coupled.

The switching element Q1 is an exemplary first switching element coupled to the positive pole of the DC power source 2 and to the one terminal of the load 3. The switching element Q2 is an exemplary second switching element coupled to the negative pole of the DC power source 2 and to the other terminal of the load 3. The switching element Q3 is an exemplary third switching element coupled to the negative pole of the DC power source 2 and to the one terminal of the load 3. The switching element Q4 is an exemplary fourth switching element coupled to the positive pole of the DC power source 2 and to the other terminal of the load 3.

To each of the switching elements Q1 to Q4, a diode is coupled in parallel. Examples of the switching elements Q1 to Q4 include, but not limited to, IGBTs (Insulated Gate Bipolar Transistors) and FETs (Field Effect Transistors).

The PWM controller 20 outputs control signals S1 to S4 respectively to the switching elements Q1 to Q4 so as to PWM-control the switching elements Q1 to Q4 between on-state and off-state, thereby controlling power supply from the DC power source 2 to the load 3.

Figure 2:
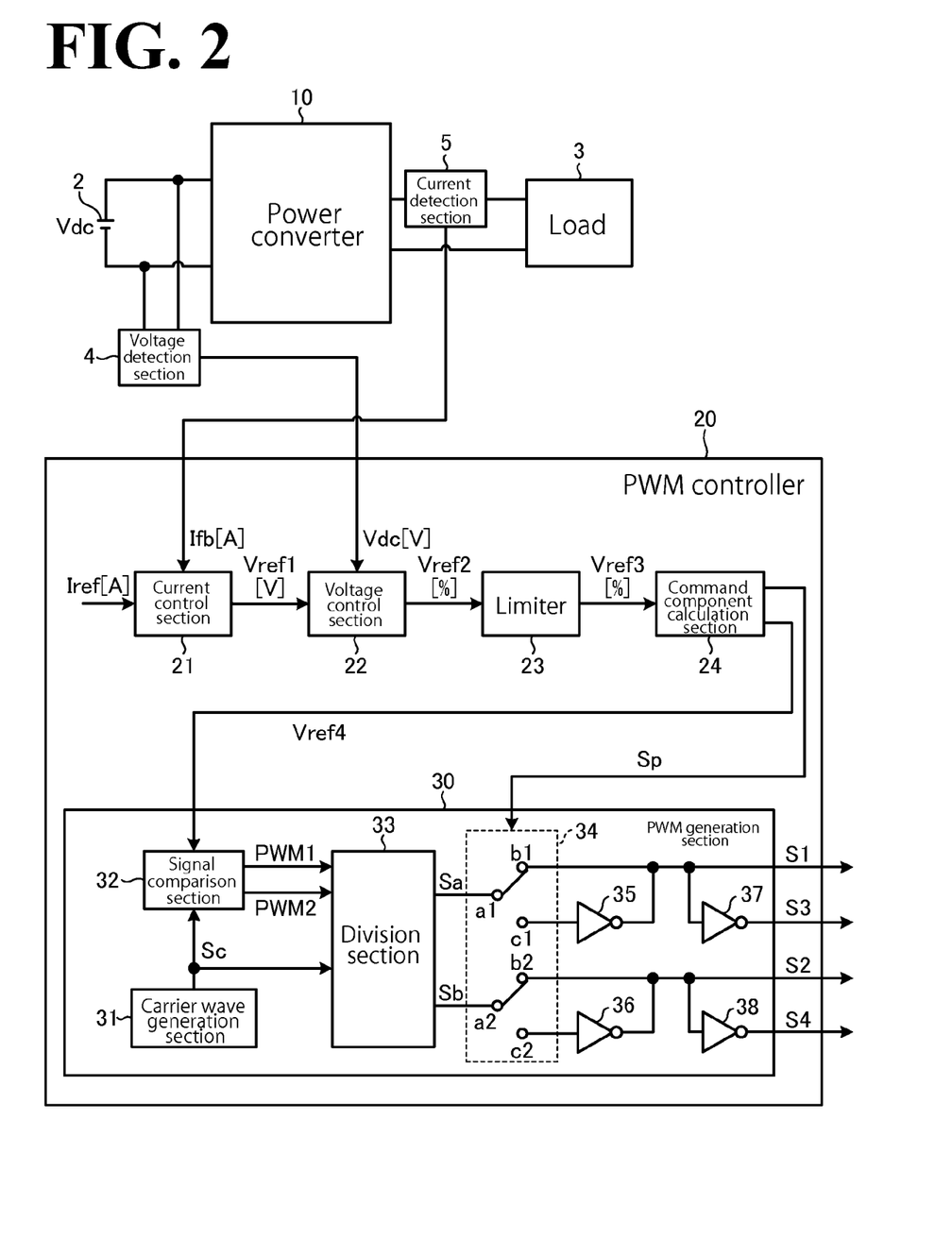
FIG. 2 is a diagram illustrating an exemplary configuration of a PWM controller according to the first embodiment.

An exemplary configuration of the PWM controller 20 will be described by referring to FIG. 2. FIG. 2 is a diagram illustrating an exemplary configuration of the PWM controller 20 according to the first embodiment. FIG. 2 shows only those components necessary for an understanding of the operation of the PWM controller 20, omitting those components of general nature.

As shown in FIG. 2, the PWM controller 20 includes a current control section 21, a voltage control section 22, a limiter 23, a command component calculation section 24, and a PWM generation section 30. The PWM generation section 30 includes a carrier wave generation section 31, a signal comparison section 32, a division section 33, a switch section 34, and reverse circuits 35 to 38.

The power conversion apparatus 1 further includes a voltage detection section 4 and a current detection section 5, which are not shown in FIG. 1. The voltage detection section 4 is a detection section to detect the power source voltage of the DC power source 2, and has one terminal coupled to the positive pole of the DC power source 2 and another terminal coupled to the negative pole of the DC power source 2. The voltage detection section 4 detects a power source voltage $V_{dc}$, which is output to the voltage control section 22.

The current detection section 5 is a detection section to detect current flowing through the load 3, and is a current sensor that utilizes, for example, a Hall device, which is a magneto-electric conversion device. The current detection section 5 detects a current (hereinafter referred to as "current feedback value") $I_{fb}$, which is output to the current control section 21.

The current control section 21 compares a current command $I_{ref}$ and the current feedback value $I_{fb}$ with one another, and generates a voltage command $V_{ref1}$ to make the difference between the current command $I_{ref}$ and the current feedback value $I_{fb}$ zero. The voltage command $V_{ref1}$ generated by the current control section 21 is output to the voltage control section 22.

The voltage control section 22 generates a voltage command $V_{ref2}$, which indicates a duty of the voltage command $V_{ref1}$ input from the current control section 21 to the power source voltage $V_{dc}$ input from the voltage detection section 4. The voltage command $V_{ref2}$ generated by the voltage control section 22 is output to the limiter 23.

The limiter 23 is an upper limiter for the voltage command $V_{ref2}$. Specifically, in the power conversion apparatus 1, when the duty of the output voltage pulse approaches 100%, the on-period and off-period of the switching elements Q1 and Q2 become short. In view of this, the limiter 23 is provided, where necessary, to restrict the on-period and off-period of the switching elements Q1 and Q2 at the upper value (for example, 95%) of the duty of the output voltage pulse. The limiter 23 outputs a voltage command $V_{ref3}$, which is input into the command component calculation section 24.

The command component calculation section 24 uses the voltage command $V_{ref3}$ input from the limiter 23 to calculate a voltage command $V_{ref4}$ and a polarity value Sp. Here, the voltage command $V_{ref4}$ is a value, specifically an absolute value, that indicates the magnitude of the voltage command $V_{ref3}$. The voltage command $V_{ref4}$ is subjected to level conversion so that the voltage command $V_{ref4}$ is normalized at the magnitude of a carrier wave signal $S_c$ from the carrier wave generation section 31. The polarity value Sp is a value indicating whether the voltage command $V_{ref3}$ is positive or negative. The voltage command $V_{ref4}$ is output to the signal comparison section 32, while the polarity value Sp is output to the switch section 34.

The carrier wave generation section 31 generates the carrier wave signal $S_c$ and outputs the carrier wave signal $S_c$ to the signal comparison section 32. The signal comparison section 32 compares the carrier wave signal $S_c$ input from the carrier wave generation section 31 with the voltage command $V_{ref4}$ input from the command component calculation section 24, thereby generating a first PWM original signal PWM1, and outputs the first PWM original signal PWM1 to the division section 33. Specifically, when the voltage command $V_{ref4}$ is greater than the signal level of the carrier wave signal $S_c$ the carrier wave generation section 31 outputs the first PWM original signal PWM1 at a high level. When the voltage command $V_{ref4}$ is equal to or less than the signal level of the carrier wave signal $S_c$ the carrier wave generation section 31 outputs the first PWM original signal PWM1 at a low level.

The signal comparison section 32 also outputs a second PWM original signal PWM2, which is any time set at a high level (active level), to the division section 33.

The voltage command $V_{ref4}$ output from the command component calculation section 24 is updated at the peaks and troughs of the carrier wave signal $S_c$.

An example of the division section 33 is a register, which replaces the first PWM original signal PWM1 and the second PWM original signal PWM2 with one another in every period of the carrier wave signal $S_c$ and sets a first PWM signal $S_a$ and a second PWM signal $S_b$.

For example, in an odd-number period of the carrier wave signal $S_c$ the division section 33 sets the first PWM original signal PWM1 as the first PWM signal $S_a$, and sets the second PWM original signal PWM2 as the second PWM signal $S_b$. In an even-number period of the carrier wave signal $S_c$ the division section 33 sets the first PWM original signal PWM1 as the second PWM signal $S_b$, and sets the second PWM original signal PWM2 as the first PWM signal $S_a$.

Thus, in the odd-number period, the division section 33 outputs the first PWM original signal PWM1 as the first PWM signal $S_a$, and outputs the second PWM original signal PWM2 as the second PWM signal $S_b$. In the even-number period, the division section 33 outputs the second PWM original signal PWM2 as the first PWM signal $S_a$, and outputs the first PWM original signal PWM1 as the second PWM signal $S_b$.

Thus, the division section 33 is an example of the first PWM signal generation section, which alternately selects the first PWM original signal PWM1 and the second PWM original signal PWM2 in every period of the carrier wave signal $S_c$ and generates the first PWM signal $S_a$. The division section 33 is also an example of the second PWM signal generation section, which, in every period of the carrier wave signal $S_c$ alternately selects the first PWM original signal PWM1 and the second PWM original signal PWM2 in an order opposite the selection order associated with generation of the first PWM signal $S_a$, and generates the second PWM signal $S_b$.

While in this embodiment the PWM controller 20 has been illustrated as including the division section 33 to function as the first PWM signal generation section and the second PWM signal generation section, the PWM controller may include the first PWM signal generation section and the second PWM signal generation section separately.

The switch section 34 includes a first switch and a second switch. The first switch switches the output destination of the first PWM signal $S_a$. The second switch switches the output destination of the second PWM signal $S_b$. The switch section 34 switches between the first switch and the second switch in accordance with the polarity value Sp input from the command component calculation section 24.

Specifically, the first switch includes contact points a1, b1, and c1. The contact point a1 is coupled to the output terminal of the first PWM signal $S_a$. The contact point b1 is coupled to the switching element Q1 of the PWM controller 20 (see FIG. 1). The contact point c1 is coupled to a reverse circuit 35. The second switch includes contact points a2, b2, and c2. The contact point a2 is coupled to the output terminal of the second PWM signal $S_b$. The contact point b2 is coupled to the switching element Q2 of the PWM controller 20 (see FIG. 1). The contact point c2 is coupled to a reverse circuit 36.

When the polarity value Sp is positive, that is, in a positive-voltage output mode, in which a positive voltage is output from the DC power source 2 to the load 3, then the switch section 34 couples the contact point a1 and the contact point b1 to one another and couples the contact point a2 and the contact point b2 to one another. Thus, the first PWM signal $S_a$ is output as a control signal S1 to the switching element Q1, and the second PWM signal $S_b$ is output as a control signal S2 to the switching element Q2.

When the polarity value Sp is negative, that is, in a negative-voltage output mode, in which a negative voltage is output from the DC power source 2 to the load 3, then the switch section 34 couples the contact point a1 and the contact point c1 to one another and couples the contact point a2 and the contact point c2 to one another. Thus, the first PWM signal $S_a$ is reversed by the reverse circuit 35, and the reversed signal is output as the control signal S1 to the switching element Q1. The second PWM signal $S_b$ is reversed by the reverse circuit 36, and the reversed signal is output as the control signal S2 to the switching element Q2.

Thus, in the positive-voltage output mode, in which a positive voltage is output from the DC power source 2 to the load 3, the PWM controller 20 outputs the first PWM signal $S_a$ to the switching element Q1, and outputs the second PWM signal $S_b$ to the switching element Q2. In the negative-voltage output mode, in which a negative voltage is output from the DC power source 2 to the load 3, the PWM controller 20 outputs a reversed signal of the first PWM signal $S_a$ to the switching element Q1 and outputs a reversed signal of the second PWM signal $S_b$ to the switching element Q2.

The PWM generation section 30 also includes reverse circuits 37 and 38. The reverse circuit 37 reverses the first PWM signal $S_a$ output from the contact point b1 of the switch section 34, or reverses the reversed signal of the first PWM signal $S_a$ output from the reverse circuit 35, and outputs the resulting reversed signal to the switching element Q3 as a control signal S3. Likewise, the reverse circuit 38 reverses the second PWM signal $S_b$ output from the contact point b2 of the switch section 34, or reverses the reversed signal of the second PWM signal $S_b$ output from the reverse circuit 36, and outputs the resulting reversed signal to the switching element Q4 as a control signal S4.

Thus, the PWM controller 20 outputs a reversed signal of the control signal S1 to the switching element Q3 as the control signal S3, and outputs a reversed signal of the control signal S2 to the switching element Q4 as the control signal S4.

Figure 3:
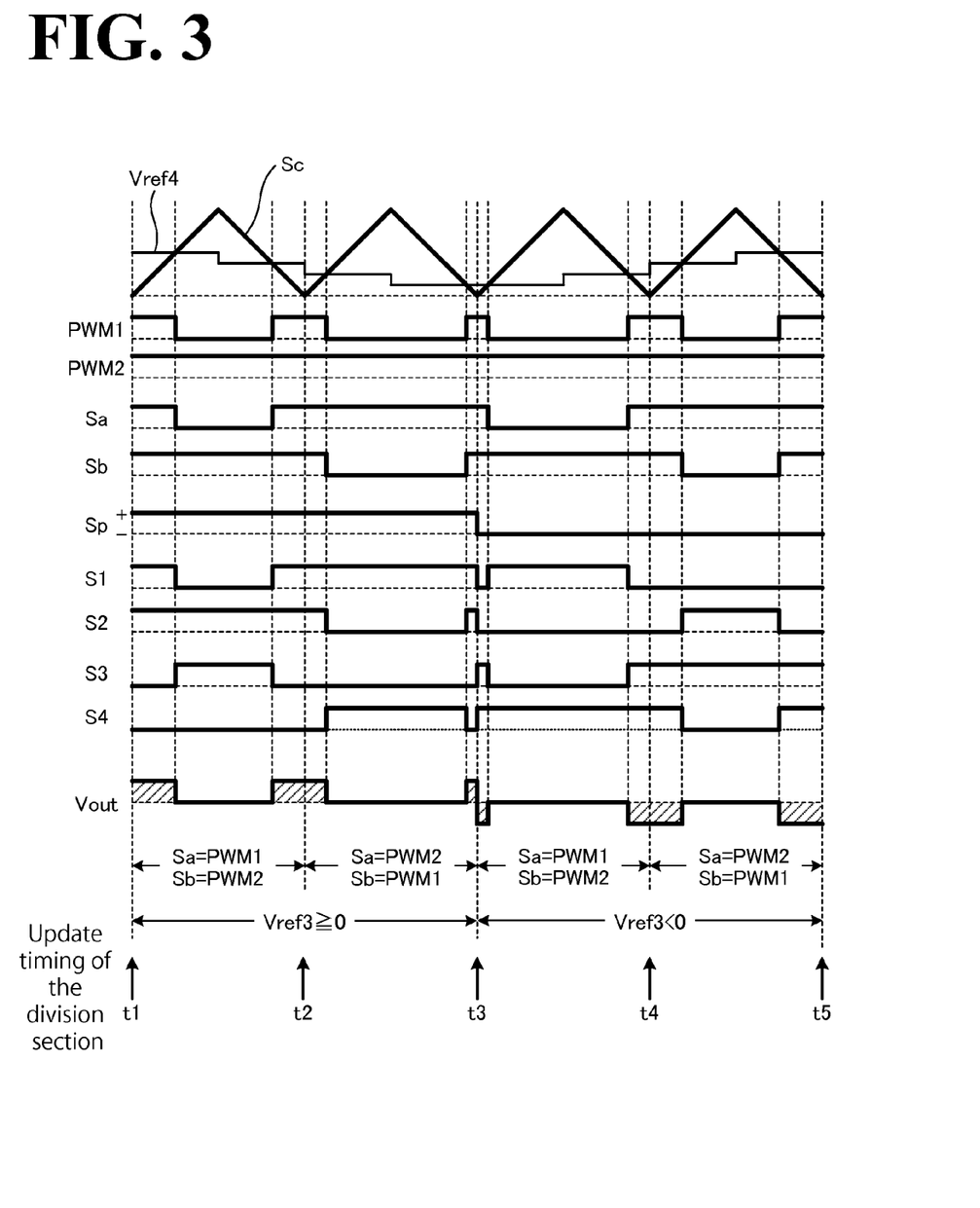
FIG. 3 is a timing chart of control signals according to the first embodiment.

Next, output timings of the control signals S1 to S4 will be described by referring to FIG. 3. FIG. 3 is a timing chart of control signals according to the first embodiment As shown in FIG. 3, the division section 33 replaces the first PWM original signal PWM1 and the second PWM original signal PWM2 with one another at timings t1 to t5, which are when the carrier wave signal $S_c$ are at its troughs.

As shown in FIG. 3, the first PWM original signal PWM1 is output at a high level when the voltage command $V_{ref4}$ is greater than the signal level of the carrier wave signal $S_c$, and is output at a low level when the voltage command $V_{ref4}$ is equal to or less than the signal level of the carrier wave signal $S_c$. The second PWM original signal PWM2 is output any time at a high level.

In an odd-number period of the carrier wave signal $S_c$ the first PWM signal $S_a$ is the first PWM original signal PWM1, and the second PWM signal $S_b$ is the second PWM original signal PWM2. Hence, the first PWM signal $S_a$ matches the first PWM original signal PWM1, and the second PWM signal $S_b$ matches the second PWM original signal PWM2. That is, in an odd-number period, the second PWM signal $S_b$ is output any time at a high level.

In an even-number period, the second PWM signal $S_b$ is the first PWM original signal PWM1, and the first PWM signal $S_a$ is the second PWM original signal PWM2. Hence, the first PWM signal $S_a$ matches the second PWM original signal PWM2, and the second PWM signal $S_b$ matches the first PWM original signal PWM1. That is, in an even-number period, the first PWM signal $S_a$ is output any time at a high level.

When the polarity value Sp is positive (that is, when the voltage command $V_{ref3} \geq 0$), the first PWM signal $S_a$ is not reversed by the reverse circuit 35 (see FIG. 2), and is output as what it is as the control signal S1. Also the second PWM signal $S_b$ is not reversed by the reverse circuit 36 (see FIG. 2), and is output as what it is as the control signal S2. Hence, when the polarity value Sp is positive, the control signal S1 matches the first PWM signal $S_a$, and the control signal S2 matches the second PWM signal $S_b$.

At the power conversion apparatus 1, when both the control signal S1 and the control signal S2 are at a high level, that is, when both the switching element Q1 and the switching element Q2 are turned on, then a positive voltage is output.

When the polarity value Sp is negative (that is, when the voltage command $V_{ref3} < 0$), the first PWM signal $S_a$ and the second PWM signal $S_b$ are respectively reversed by the reverse circuit 35 and the reverse circuit 36 (see FIG. 2). Hence, when the polarity value Sp is negative and in an odd-number period, a reversed signal of the first PWM signal $S_a$ is output as the control signal S1, and a reversed signal of the second PWM signal $S_b$ is output as the control signal S2. When the polarity value Sp is negative and in an even-number period, a reversed signal of the second PWM signal $S_b$ is output as the control signal S1, and a reversed signal of the first PWM signal $S_a$ is output as the control signal S2.

The control signal S3 and the control signal S4 are reversed signals of the control signal S1 respectively reversed by the reverse circuit 37 and the reverse circuit 38 (see FIG. 2). Hence, when the polarity value Sp is negative and in an odd-number period, a reversed signal of the control signal S2, that is, a signal that is any time at a high level is output as the control signal S4. When the polarity value Sp is negative and in an odd-number period, a reversed signal of the control signal S1, that is, a signal that is any time at a high level is output as the control signal S3.

At the power conversion apparatus 1, when both the control signal S3 and the control signal S4 are at a high level, that is, when both the switching element Q3 and the switching element Q4 are turned on, then a negative voltage is output.

Thus, the PWM controller 20 subjects the switching elements Q1 to Q4 to PWM control so as to repeat an on-period $T_{on}$, during which a voltage is output from the DC power source 2 to the load 3, and an off-period $T_{off}$, during which no voltage is output from the DC power source 2 to the load 3. The on-period $T_{on}$ is a period during which both the control signal S1 and the control signal S2 are at a high level (active level). Specifically, the power converter 10 outputs a positive voltage (+$V_{dc}$) when both the control signal S1 and the control signal S2 are at a high level, that is, when both the switching element Q1 and the switching element Q2 are turned on.

The off-period $T_{off}$ is a period during which one of the control signal S1 and the control signal S2 is at a high level, and the other one of the control signal S1 and the control signal S2 is at a low level. Every time the off-period $T_{off}$ is on, the PWM controller 20 switches between the state in which the control signal S1 is at a high level and the control signal S2 is at a low level and the state in which the control signal S1 is at a low level and the control signal S2 is at a high level. That is, every time the off-period $T_{off}$ is on, the PWM controller 20 alternately turns on the switching element Q1 and the switching element Q2.

This ensures PWM control of keeping the on-periods of the switching elements Q1 and Q2 from becoming short even when a significantly small voltage is output.

As has been described hereinbefore, the power conversion apparatus 1 according to the first embodiment includes the power converter 10 and the PWM controller 20. The power converter 10 includes the switching elements Q1 to Q4. The switching element Q1 is coupled to the positive pole of the DC power source 2 and to one terminal of the load 3. The switching element Q2 is coupled to the negative pole of the DC power source 2 and to the other terminal of the load 3. The switching element Q3 is coupled to the positive pole of the DC power source 2 and to the other terminal of the load 3. The switching element Q4 is coupled to the negative pole of the DC power source 2 and to the one terminal of the load 3. The PWM controller 20 subjects the power converter 10 to PWM control so as to repeat the on-period $T_{on}$ and the off-period $T_{off}$. During the on-period $T_{on}$, a voltage is output from the DC power source 2 to the load 3. During the off-period $T_{off}$, no voltage is output from the DC power source 2 to the load 3. Then, the PWM controller 20 alternately controls the switching element Q1 and the switching element Q2 based on a signal that is set at a high level or a low level any time during the carrier wave period.

This eliminates or minimizes the need for shortening the on-periods and off-periods of the switching elements Q1 to Q4 even when a significantly small voltage is output, enhancing the accuracy of the output voltage. Additionally, the number of times of switching is smaller than the number conventionally required. This reduces a switching loss.

Further, in the power conversion apparatus 1 according to the first embodiment, the PWM controller 20 alternately turns on the switching element Q3 and the switching element Q4 every time the off-period $T_{off}$ is on, thereby allowing AC power to be output to the load 3.

Second Embodiment

As opposed to the first embodiment, which is an exemplary power conversion apparatus that outputs AC power to a load, the second embodiment is an exemplary power conversion apparatus that outputs DC power to a load.

Figure 4:
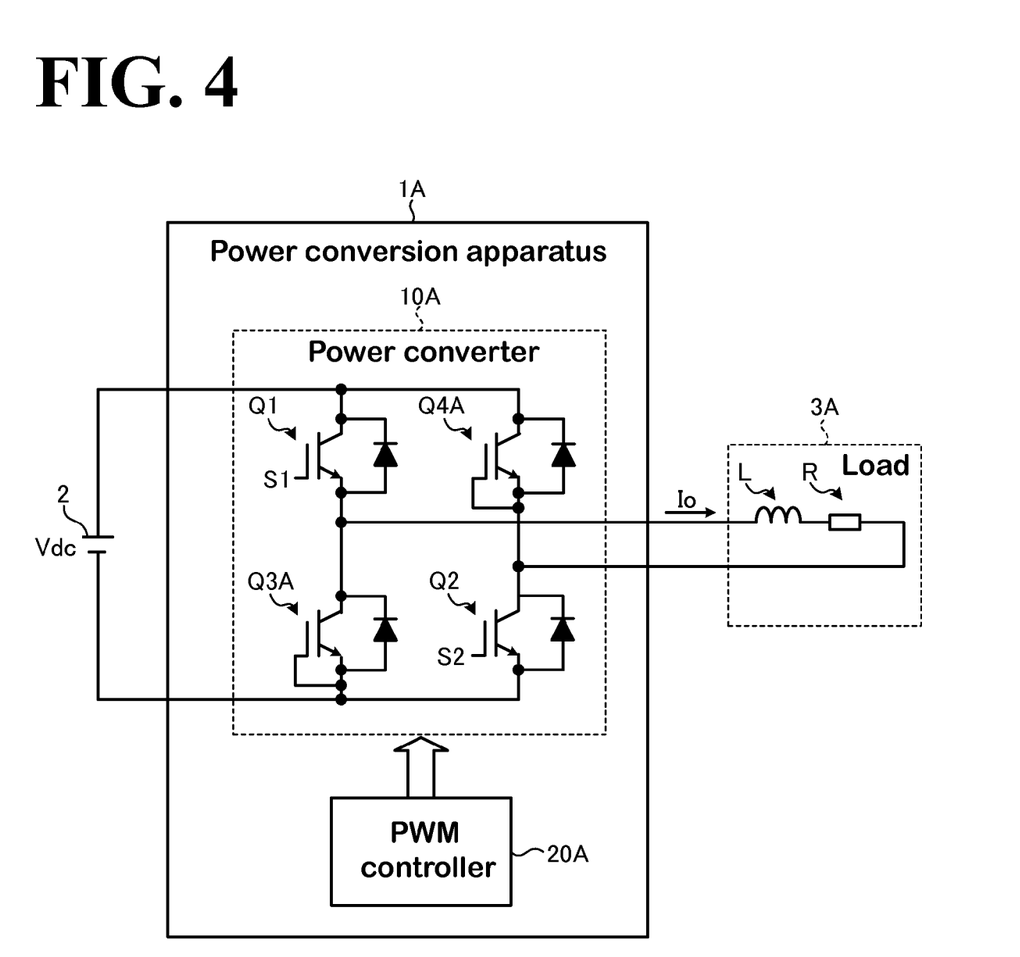
FIG. 4 is a diagram illustrating a power conversion apparatus according to a second embodiment.

FIG. 4 is a diagram illustrating a power conversion apparatus according to the second embodiment. In the following description, the elements that have been already described are designated the same reference numerals as in the above-described description, and description of these elements will be omitted.

As shown in FIG. 4, a power conversion apparatus 1A according to the second embodiment includes a power converter 10A instead of the power converter 10. The power conversion apparatus 1A also includes a PWM controller 20A instead of the PWM controller 20. The power conversion apparatus 1A continuously supplies one direction of current to a load 3A. The load 3A is an inductive load and includes a coil L and a resistor R, which is due to a copper loss or a like cause.

The power converter 10A includes a switching element Q3A and a switching element Q4A instead of the switching element Q3 and the switching element Q4. To each of the switching element Q3A and the switching element Q4A, an input node is secured so as to ensure that the switching element Q3A and the switching element Q4A are any time in off state. The switching elements Q3A and Q4A are not subjected to PWM control. For example, when each of the switching elements Q3A and Q4A is an IGBT, the gate and the emitter are short-circuited. Instead of short-circuiting the gate and the emitter, it is also possible to make the PWM controller 20A output to the switching elements Q3A and Q4A a signal that is any time at a low level.

The PWM controller 20A outputs the control signals S1 and S2 respectively to the switching elements Q1 and Q2, thereby controlling the switching elements Q1 and Q2 between on-state and off-state. In this manner, the PWM controller 20A controls supply of DC power from the DC power source 2 to the load 3A.

Figure 5:
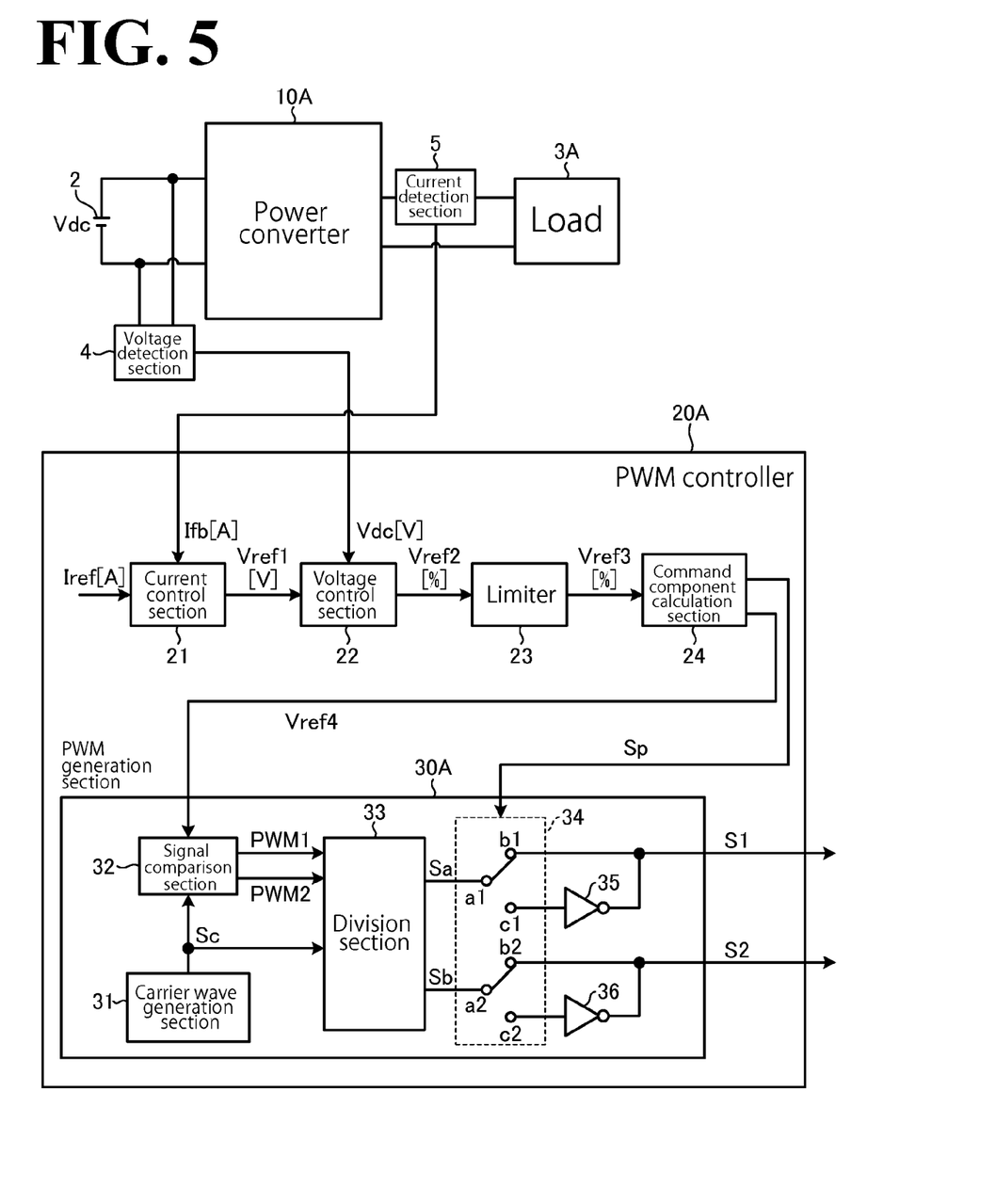
FIG. 5 is a diagram illustrating an exemplary configuration of a PWM controller according to the second embodiment.

Next, an exemplary configuration of the PWM controller 20A according to the second embodiment will be described by referring to FIG. 5. FIG. 5 is a diagram illustrating an exemplary configuration of the PWM controller 20A according to the second embodiment.

As shown in FIG. 5, the PWM controller 20A includes a PWM generation section 30A instead of the PWM generation section 30. The PWM generation section 30A has the configuration of the PWM generation section 30 deprived of the reverse circuit 37 and the reverse circuit 38. Hence, the PWM controller 20A according to the second embodiment outputs only the control signal S1 and the control signal S2.

Figure 6:
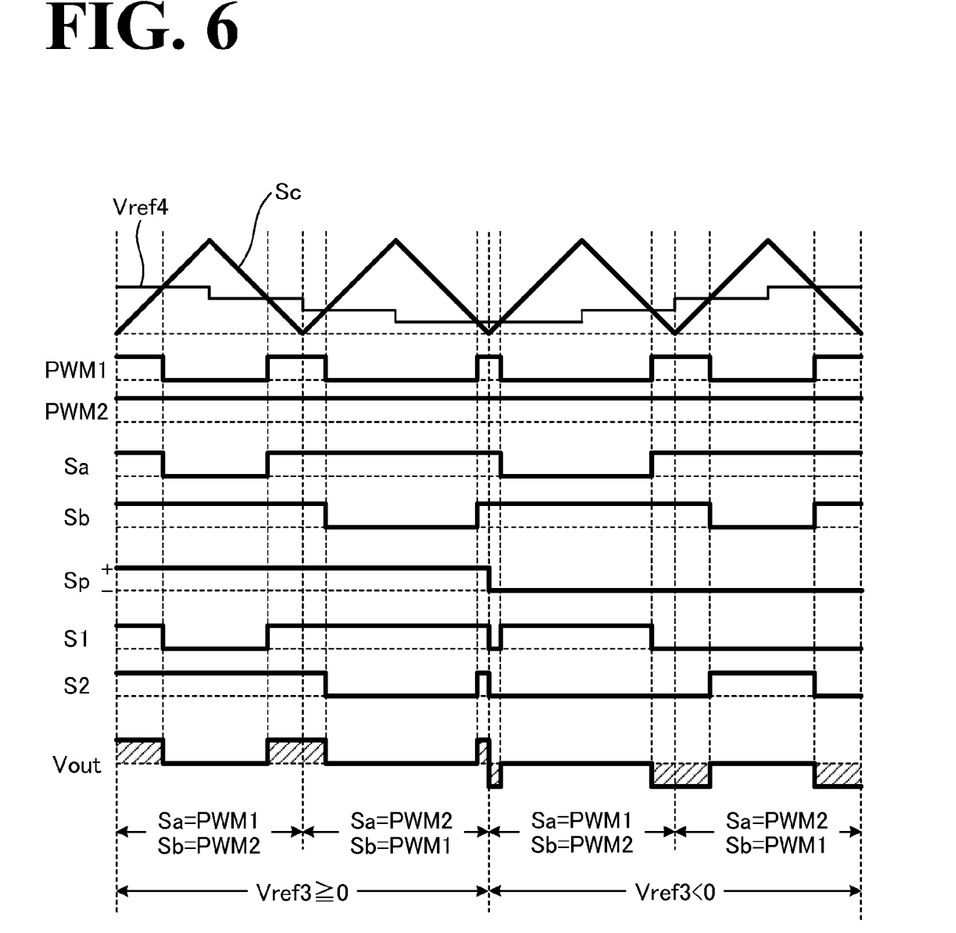
FIG. 6 is a timing chart of control signals according to the second embodiment.

Next, output timings of the control signals S1 and S2 will be described by referring to FIG. 6. FIG. 6 is a timing chart of control signals according to the second embodiment. As shown in FIG. 6, in the power conversion apparatus 1A according to the second embodiment, a positive voltage is output during the periods during which both the control signal S1 and the control signal S2 are at a high level, and one direction of DC current $I_o$ flows to the load 3A. Next, in the power conversion apparatus 1A, a negative voltage is output during the periods during which both the control signal S1 and the control signal S2 are at a low level.

Specifically, when both the control signals S1 and S2 are at a low level, all the switching elements Q1, Q2, Q3A, and Q4A are in off-state, and a current flows following the path: the DC power source 2→the diode of the switching element Q3A→the load 3A→the diode of the switching element Q4A→the DC power source 2. As a result, a negative voltage is output, which changes the magnitude of the DC current $I_o$ flowing through the load 3A.

When the control signal S1 is at a high level while the control signal S2 is at a low level, only the switching element Q1 is in on-state. This results in a freewheeling mode, in which current circulates through the path: the switching element Q1→the load 3A→the diode of the switching element Q4A→the switching element Q1, allowing no voltage to be output.

When the control signal S1 is at a low level while the control signal S2 is at a high level, only the switching element Q2 is in on-state. This also results in a freewheeling mode, in which current circulates through the path: the switching element Q2→the diode of the switching element Q3A→the load 3A→the switching element Q2, allowing no voltage to be output.

When both the control signals S1 and S2 are at a high level, both the switching element Q1 and the switching element Q2 are turned on to output a positive voltage ($+V_{dc}$), similarly to the first embodiment.

Thus, the power conversion apparatus according to this embodiment finds applications in power conversion apparatuses that output DC power to a load.

In this embodiment, the power converter 10A has been illustrated as including four switching elements Q1, Q2, Q3A, and Q4A. When, however, the load is an inductive load, the power converter may include diodes instead of the switching elements Q3A and Q4A. Even when diodes replace the switching elements Q3A and Q4A, similar operations to the operations in the second embodiment are ensured.

Also in this embodiment, the switching elements Q3A and Q4A have been illustrated as being switching elements that are any time in off-state, so that the switching elements Q3A and Q4A are not subjected to any control. It is also possible, however, to provide, for example, the switching elements Q3 and Q4 instead of the switching elements Q3A and Q4A, and to make the PWM controller continuously output to the switching elements Q3 and Q4 a control signal that is any time at a low level.

Third Embodiment

Incidentally, as shown in FIGS. 3 and 6, at the timing when the polarity value Sp changes (in this embodiment, positive→negative), the control signals are reversed. This results in a possibility of a shortened period for outputting the control signals at a high level. That is, there is a possibility of a shortened on-period of the switching elements. In view of this, in the third embodiment, a certain measure is implemented to eliminate or minimize this occurrence, which will be described below.

Figure 7:
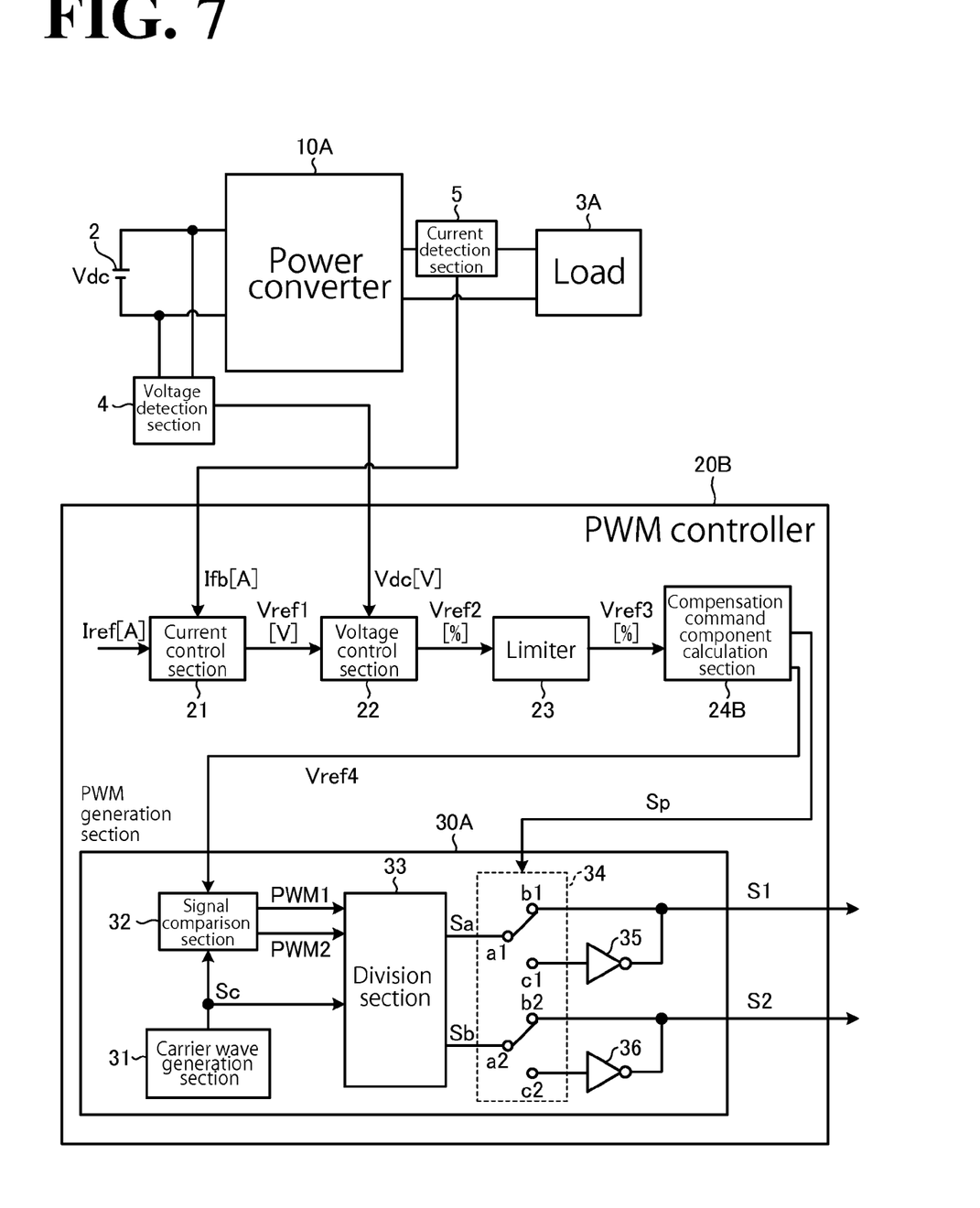
FIG. 7 is a diagram illustrating an exemplary configuration of a PWM controller according to a third embodiment.
Figure 8:
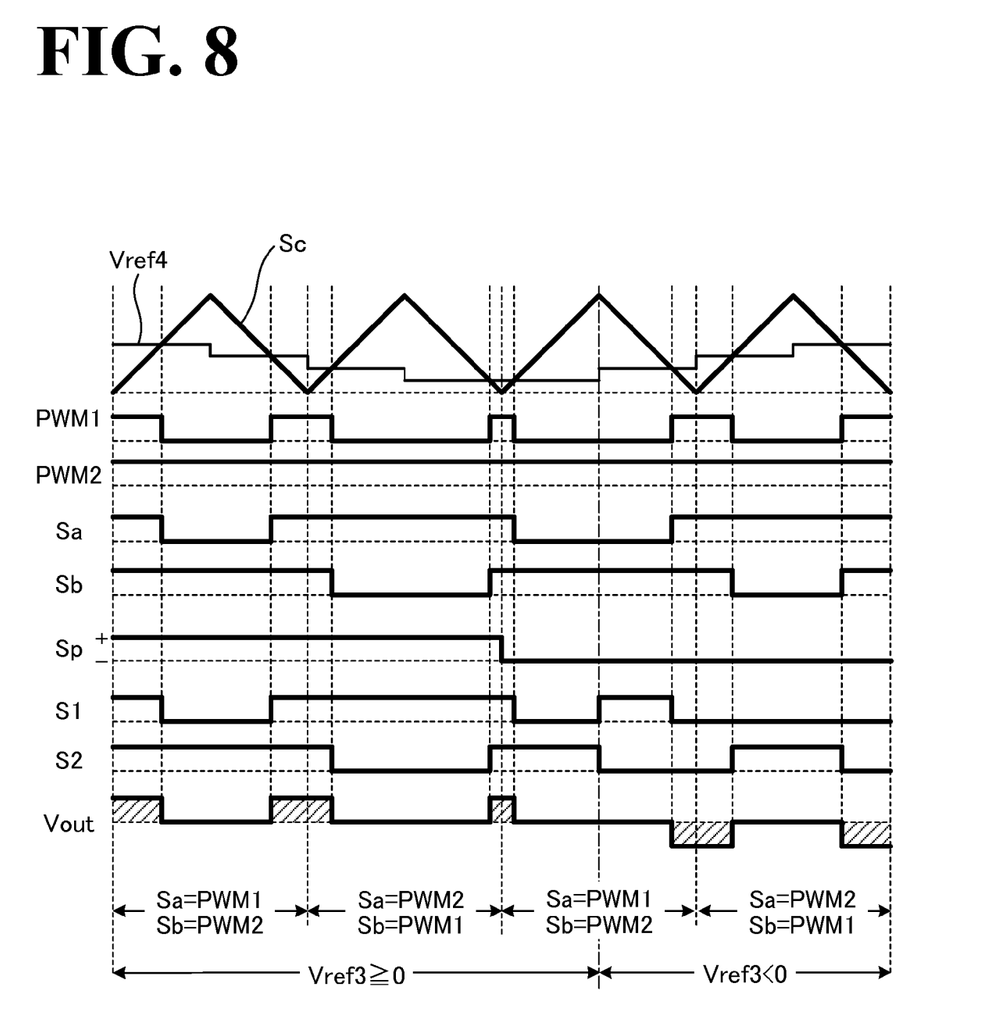
FIG. 8 is a timing chart of control signals according to the third embodiment.

FIG. 7 is a diagram illustrating an exemplary configuration of a PWM controller according to the third embodiment. FIG. 8 is a timing chart of control signals according to the third embodiment. While the following description exemplifies the power conversion apparatus 1A according to the second embodiment with some changes, it is also possible to make similar changes to the power conversion apparatus 1 according to the first embodiment.

As shown in FIG. 7, the PWM controller 20B according to the third embodiment includes a compensation command component calculation section 24B instead of the command component calculation section 24 of the PWM controller 20A according to the second embodiment. The other aspects of the configuration of the PWM controller 20B are similar to the configuration of the PWM controller 20A; similarly to the PWM controllers 20 and 20A, when the polarity value Sp is positive, the PWM controller 20B operates in the positive-voltage output mode, while when the polarity value Sp is negative, the PWM controller 20B operates in the negative-voltage output mode.

For a predetermined period of time after the voltage command $V_{ref3}$ changed its polarity, the compensation command component calculation section 24B outputs to the switch section 34 the polarity value Sp corresponding to a point of time immediately before the voltage command $V_{ref3}$ changed its polarity. Specifically, the compensation command component calculation section 24B holds the previous polarity value, and when the current polarity value has any change relative to the previous polarity value, the compensation command component calculation section 24B updates the polarity value after half the period of the carrier wave signal $S_c$. For example, when the voltage command $V_{ref3}$ changes its polarity from positive to negative, the compensation command component calculation section 24B outputs the polarity value Sp as positive for half the period after the timing at which the polarity changed from positive to negative (see FIG. 8). When the voltage command $V_{ref3}$ changes its polarity from negative to positive, the compensation command component calculation section 24B outputs the polarity value Sp as negative for half the period after the timing at which the polarity changed from negative to positive.

This causes a delay in the update timing of the polarity-changed voltage command $V_{ref3}$ by half the period of the carrier wave signal $S_c$, as shown in FIG. 8. However, there is no or minimal possibility of a shortened period for outputting the control signals at a high level.

It is noted that when the above-described measure is implemented, the voltage actually to be output has a polarity reversed from the polarity of the voltage originally intended to be output. For example, a positive voltage, $+V_{dc}$, is output during a period that is originally intended for a negative voltage, $-V_{dc}$, creating an error equivalent to twice $V_{dc}$. In view of this, the compensation command component calculation section 24B may adjust the voltage command $V_{ref4}$ so as to compensate for this error in the next or later on-periods.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power conversion apparatus comprising:
   a power converter comprising:
      a first switching element coupled to a positive pole of a DC power source and to one terminal of a load;
      a second switching element coupled to a negative pole of the DC power source and to another terminal of the load;
      a third switching element coupled to the positive pole of the DC power source and to the other terminal of the load; and
      a fourth switching element coupled to the negative pole of the DC power source and to the one terminal of the load; and
   a PWM controller configured to subject the power converter to PWM control so as to repeat an on-period during which a voltage is output from the DC power source to the load and an off-period during which no voltage is output from the DC power source to the load, the PWM controller being configured to alternately control the first switching element and the second switching element based on a signal that is set at a high level or a low level any time during a carrier wave period, the PWM controller comprising:
      a signal comparison section configured to output a first PWM original signal that is based on a comparison between a command value and a carrier wave signal, and configured to output a second PWM original signal that is set at the high level or the low level;
      a first PWM signal generation section configured to alternately select the first PWM original signal and the second PWM original signal in every period of the carrier wave signal so as to generate a first PWM signal; and
      a second PWM signal generation section configured to, in every period of the carrier wave signal, alternately select the first PWM original signal and the second PWM original signal in an order opposite a selection order associated with generation of the first PWM signal, so as to generate a second PWM signal, and the PWM controller configured to control the first switching element and the second switching element based on the first PWM signal and the second PWM signal.

2. The power conversion apparatus according to claim 1, wherein in a positive-voltage output mode, in which a positive voltage is output from the DC power source to the load, the PWM controller is configured to output the first PWM signal to the first switching element and configured to output the second PWM signal to the second switching element, and
wherein in a negative-voltage output mode, in which a negative voltage is output from the DC power source to the load, the PWM controller is configured to output a reversed signal of the first PWM signal to the first switching element and configured to output a reversed signal of the second PWM signal to the second switching element.

3. The power conversion apparatus according to claim 2, further comprising a command component calculation section configured to calculate the command value to indicate a size of the voltage command and configured to calculate a polarity value indicating a polarity of the voltage command,
wherein the PWM controller is configured to operate in the positive-voltage output mode when the polarity value is positive, and configured to operate in the negative-voltage output mode when the polarity value is negative, and
wherein for a predetermined period of time after the voltage command has changed its polarity, the command component calculation section is configured to output the polarity value corresponding to a point of time immediately before the voltage command changed its polarity.

4. The power conversion apparatus according to claim 3, further comprising an upper limiter for the voltage command at a previous position relative to the command component calculation section.

5. The power conversion apparatus according to claim 4, wherein the PWM controller is configured to alternately turn on the third switching element and the fourth switching element every time the off-period is on.

6. The power conversion apparatus according to claim 5, wherein the load comprises an inductive load, and
wherein the third switching element and the fourth switching element are each replaced with a diode.

7. The power conversion apparatus according to claim 4, wherein the load comprises an inductive load, and
wherein the third switching element and the fourth switching element are each replaced with a diode.

8. The power conversion apparatus according to claim 3, wherein the PWM controller is configured to alternately turn on the third switching element and the fourth switching element every time the off-period is on.

9. The power conversion apparatus according to claim 8, wherein the load comprises an inductive load, and
wherein the third switching element and the fourth switching element are each replaced with a diode.

10. The power conversion apparatus according to claim 3, wherein the load comprises an inductive load, and
wherein the third switching element and the fourth switching element are each replaced with a diode.

11. The power conversion apparatus according to claim 2, wherein the PWM controller is configured to alternately turn on the third switching element and the fourth switching element every time the off-period is on.

12. The power conversion apparatus according to claim 11, wherein the load comprises an inductive load, and
wherein the third switching element and the fourth switching element are each replaced with a diode.

13. The power conversion apparatus according to claim 2, wherein the load comprises an inductive load, and
wherein the third switching element and the fourth switching element are each replaced with a diode.

14. The power conversion apparatus according to claim 1, wherein the PWM controller is configured to alternately turn on the third switching element and the fourth switching element every time the off-period is on.

15. The power conversion apparatus according to claim 14, wherein the load comprises an inductive load, and
wherein the third switching element and the fourth switching element are each replaced with a diode.

16. The power conversion apparatus according to claim 1, wherein the load comprises an inductive load, and
wherein the third switching element and the fourth switching element are each replaced with a diode.

17. A power conversion apparatus comprising:
a power converter comprising:
a first switching element coupled to a positive pole of a DC power source and to one terminal of a load;
a second switching element coupled to a negative pole of the DC power source and to another terminal of the load;
a third switching element coupled to the positive pole of the DC power source and to the other terminal of the load; and
a fourth switching element coupled to the negative pole of the DC power source and to the one terminal of the load; and
a PWM controller configured to subject the power converter to PWM control so as to repeat an on-period during which a voltage is output from the DC power source to the load and an off-period during which no voltage is output from the DC power source to the load the PWM controller being configured to alternately control the first switching element and the second switching element based on a signal that is set at a high level or a low level any time during a carrier wave period, the PWM controller being configured to control one switching element of the first switching element and the second switching element based on a comparison between a command value and a carrier wave signal during a period of the carrier wave signal and to control the other switching element of the first switching element and the second switching element to be in an off state or in an on state at any time during the carrier wave period, the PWM controller being configured to switch the one switching element and the other switching element during every period of the carrier wave signal, the PWM controller comprising:
a signal comparison section configured to output a first PWM original signal that is based on a comparison between the command value and the carrier wave signal, and configured to output a second PWM original signal that is set at the high level or the low level;
a first PWM signal generation section configured to alternately select the first PWM original signal and the second PWM original signal in every period of the carrier wave signal so as to generate a first PWM signal; and
a second PWM signal generation section configured to, in every period of the carrier wave signal, alternately select the first PWM original signal and the second PWM original signal in an order opposite a selection order associated with generation of the first PWM signal, so as to generate a second PWM signal, and the PWM controller configured to control the first switching element and the second switching element based on the first PWM signal and the second PWM signal.

* * * * *